June 2, 1959  R. P. NORTHCOTT ET AL  2,889,273
PRODUCTION OF HYDROGEN
Filed April 27, 1956
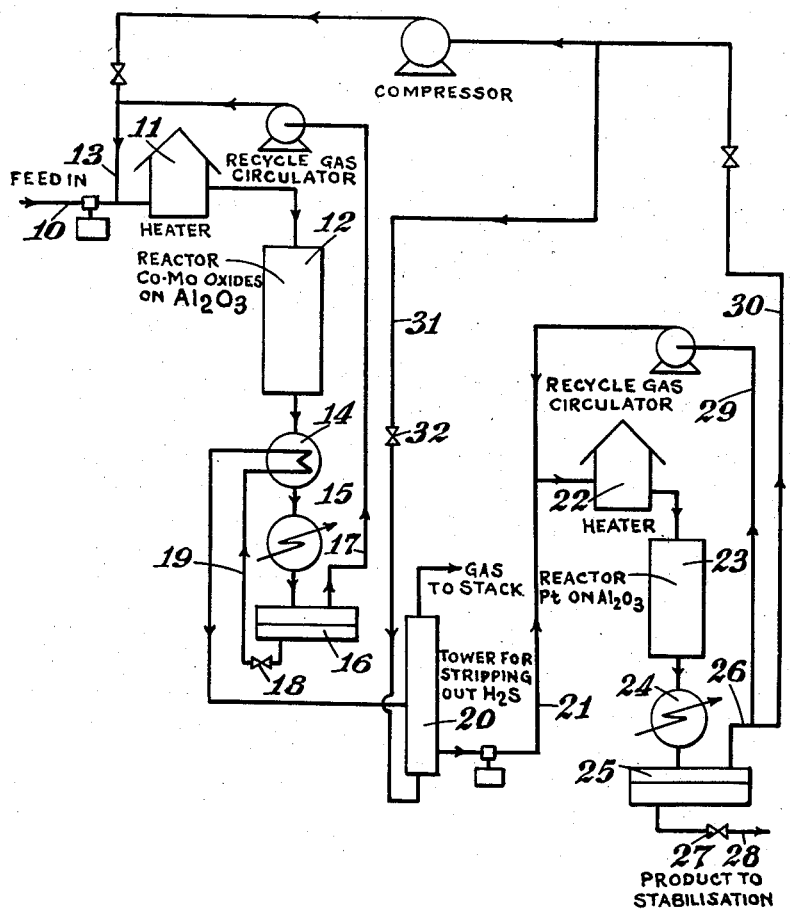
INVENTORS
ROY PURDY NORTHCOTT
JOHN ARTHUR EDGAR MOY
BY
ATTORNEYS

United States Patent Office 2,889,273
Patented June 2, 1959

2,889,273

PRODUCTION OF HYDROGEN

Roy Purdy Northcott and John Arthur Edgar Moy, Sunbury-on-Thames, England, assignors to The British Petroleum Company Limited, London, England, a British joint-stock corporation Application April 27, 1956, Serial No. 581,022

Claims priority, application Great Britain May 12, 1955

5 Claims. (Cl. 208—210)

This invention relates to the production of hydrogen and in particular to the production of hydrogen from petroleum hydrocarbons that have been subjected to hydrocatalytic desulphurisation in which the hydrocarbons are contacted in the presence of hydrogen at elevated temperature and pressure with a sulphur-resistant hydrogenation catalyst whereby organically combined sulphur in the hydrocarbons is converted into hydrogen sulphide.

As the process was originally developed it involved a net consumption of hydrogen proportional to the amount of sulphur removed, and the commerical application of the process was limited by the cost of supplying the necessary hydrogen. Two recent developments have changed the economic aspects of the process, however. Firstly, the development of the autofining process, in which the hydrogen necessary for desulphurisation is obtained from the feedstock by a controlled dehydrogenation, has removed the need for an extraneous source of hydrogen in respect of a large class of feedstocks. Secondly, the development of catalytic reforming processes for the upgrading of naphthas has made available considerable quantities of hydrogen-rich gases suitable for use in the hydrocatalytic desulphurisation process. It may still happen, however, that the amount of hydrogen available in a particular refinery in which catalytic reforming processes are provided, may not be sufficient to carry out hydrogen-consuming processes to the extent that might otherwise be desired, so that additional sources of hydrogen are always desirable.

It is known that the hydrocatalytic desulphurisation process may be successfully applied to relatively high-boiling petroleum distillates such as gas oils, and it has now been discovered that considerable quantities of hydrogen may be derived from such high boiling distillates after desulphurisation without adversely affecting the properties of the desulphurised products.

Thus, according to the present invention, a relatively high-boiling petroleum distillate, such as gas oil, that has been subjected to hydrocatalytic desulphurisation, is contacted at elevated temperature and pressure and in the presence of hydrogen with a catalyst consisting essentially of a platinum group metal on a metal oxide support, and a hydrogen-rich gas is separated from the treated product, part of said gas being recycled to the reaction zone.

The catalyst preferably consists essentially of platinum on alumina and may advantageously contain a halogen, preferably fluorine.

The process conditions may vary within the following limits:

Temperature ------------------ 600° to 850° F.
Pressure --------------------- 50 to 500 p.s.i.g.
Space velocity --------------- 1 to 10 v./v./hr.
Gas recycle rate ------------- 1000 to 4000 s.c.f./b.

The hydrogen-rich gas produced may be used with particular advantage to desulphurise the feedstock to be treated in accordance with the invention. Thus, the invention also comprises a process for the desulphurisation of petroleum hydrocarbon which comprises passing a relatively high boiling petroleum distillate, such as gas oil, to a first reaction zone wherein it is contacted in the presence of hydrogen with a sulphur-resistant hydrogenation catalyst at elevated temperature and pressure such that organically combined sulphur contained in the distillate is converted into hydrogen sulphide, separating a distillate of reduced sulphur content from the products of the first reaction zone, passing said desulphurised distillate to a second reaction zone wherein it is contacted at elevated temperature and pressure and in the presence of hydrogen with a catalyst consisting essentially of a platinum group metal on a metal oxide support, separating a hydrogen-rich gas from the products of the second reaction zone, and recycling said hydrogen-rich gas to said reaction zones.

The desulphurisation stage may advantageously be carried out under the following conditions:

Temperature ------------------ 600°–800° F.
Pressure --------------------- 100–1500 p.s.i.g.
Space velocity --------------- ½–15 v./v./hr.
Recycle rate ----------------- 200–4000 s.c.f./b.

The preferred catalyst for use in the desulphurisation stage comprises the oxides of cobalt and molybdenum supported on alumina.

A suitable plant for carrying out such an integrated process is diagrammatically illustrated in the accompanying drawing.

The feedstock enters via line 10 and passes through a heater 11 into a reactor 12 in admixture with a hydrogen-rich gas admitted via line 13. In the reactor 12, the feedstock is contacted at elevated temperature and pressure with a sulphur-resistant hydrogenation catalyst and is then passed via heat exchanger 14 and cooler 15 to a high pressure separator 16 wherein it is liquified while still under plant pressure, a hydrogen-rich gas being removed from the separator 16 via line 17 and recycled into admixture with fresh feedstock via line 13. The liquified feedstock containing dissolved hydrogen sulphide is removed from the separator 16 via reducing valve 18 and line 19 and after being passed in heat exchange with the hot product in heat exchanger 14 is passed to a stripping tower 20 wherein hydrogen sulphide is removed and passed to the stack or otherwise disposed of. The product from the tower 20, now free of hydrogen sulphide, is passed via line 21 and heater 22 to a reactor 23 wherein it is contacted with a catalyst consisting essentially of platinum on alumina so as to bring about a limited dehydrogenation of the feedstock. The products from the reactor 23 are passed via a cooler 24 to a high pressure separator 25 wherein the liquified feedstock collects, a hydrogen-rich gas being removed from the separator 25 via line 26 and the liquid product via valve 27 and line 28. Some of the gas removed from the separator 25 is recycled to the dehydrogenation reactor 23 via line 29 and the remainder is recycled to the desulphurisation reactor 12 via line 30. Part of the gas may be passed via line 31 and valve 32 to the base of the stripping tower 20.

The production of hydrogen by the process of the invention is illustrated in the following example:

Example

A Kuwait gas oil, having the properties shown in the table below, was passed over a catalyst consisting of the mixed oxides of cobalt and molydbenum on alumina under the following conditions:

Temperature _____ 780° F.
Pressure _____ 1000 p.s.i.g.
Space velocity _____ 8.0 v./v./hr. of liquid feedstock.
Recycle rate _____ 4000 s.c.f./b.

The catalyst had the following chemical analysis:

$MoO_3$ _____ 15.75 g./100 g. stable at 1020° F.
CoO _____ 3.2 g./100 g. stable at 1020° F.

The product after stabilisation and soda washing had a sulphur content of 0.01% wt. and other properties as shown in the table.

This desulphurised gas oil was then contacted with a catalyst containing platinum and halogen on alumina, under the following conditions:

Temperature _____ 780° F.
Pressure _____ 100 p.s.i.g.
Space velocity _____ 2.0 v./v./hr.
Recycle rate _____ 2000 s.c.f./b.

The catalyst had the following chemical analysis:

Pt _____ 0.37 g./100 g. stable at 1020° F.
F _____ 0.51 g./100 g. stable at 1020° F.
Cl _____ 0.26 g./100 g. stable at 1020° F.
Na _____ 0.001 g./100 g. stable at 1020° F.

Over a period of 40 hours, the average amount of hydrogen produced was 279 s.c.f./b. The liquid product had the properties shown in the table.

|  | Kuwait gas oil | Hydrofined gas oil | Hydrofined gas oil after treatment over Pt on $Al_2O_3$ |
|---|---|---|---|
| Specific gravity, 60° F./60° F. | 0.844 | 0.8295 | 0.837 |
| Sulphur content, percent weight | 1.26 | 0.01 | ---- |
| Bromine number | 3.7 | 1.9 | 5.9 |
| ASTM distillation: | | | |
| I.B.P., ° C. | 248 | 227 | 91 |
| 2% vol. recovered at ° C. | ---- | 242.5 | 151 |
| 5% vol. recovered at ° C. | 265 | 251 | 216 |
| 10% vol. recovered at ° C. | 269.5 | 259.5 | 238.5 |
| 20% vol. recovered at ° C. | 276.5 | 266.5 | 257 |
| 30% vol. recovered at ° C. | 281 | 273 | 267 |
| 40% vol. recovered at ° C. | 285.5 | 278.5 | 274 |
| 50% vol. recovered at ° C. | 290.5 | 284 | 280.5 |
| 60% vol. recovered at ° C. | 297 | 290 | 287.5 |
| 70% vol. recovered at ° C. | 305 | 298 | 294.5 |
| 80% vol. recovered at ° C. | 314.5 | 308.5 | 304 |
| 90% vol. recovered at ° C. | 330 | 323.5 | 317 |
| F.B.P., ° C. | 360 | 349 | 361 |

We claim:
1. A process for the desulphurisation of petroleum hydrocarbons, which comprises passing a petroleum distillate boiling in the gas oil boiling range to a first reaction zone wherein it is contacted in the presence of hydrogen with a sulphur-resistant hydrogenation catalyst at a temperature in the range 600°–850° F. and at a pressure in the range 100–1500 p.s.i.g. such that organically combined sulphur contained in the distillate is converted into hydrogen sulphide, separating a distillate of reduced sulphur content from the products of the first reaction zone, passing said desulphurised distillate to a second reaction zone wherein it is contacted at a temperature of 600°–800° F. and a pressure of 50–500 p.s.i.g. and in the presence of hydrogen with a catalyst consisting essentially of a platinum group metal on a metal oxide support, such that hydrogen is produced from said desulphurised distillate without adversely affecting the properties of the desulphurised distillate as respects its suitability for normal uses, separating a hydrogen-rich gas from the products of the second reaction zone, and recycling said hydrogen-rich gas to both said reaction zones.

2. A process in accordance with claim 1, in which the catalyst employed in the first reaction zone consists essentially of the oxides of cobalt and molybdenum on alumina.

3. A process in accordance with claim 1, wherein the catalyst employed in the second reaction zone consists essentially of platinum supported on alumina.

4. A process in accordance with claim 3, wherein the catalyst employed in the second reaction zone contains a small proportion of combined fluorine.

5. A process for the production of hydrogen, which comprises contacting a petroleum distillate boiling in the gas oil boiling range, said distillate having been previously hydrocatalytically desulphurised, at a temperature of 600°–800° F. and a pressure of 50–500 p.s.i.g. and in the presence of hydrogen, with a catalyst consisting essentially of a platinum group metal on a metal oxide support, such that hydrogen is produced from said desulphurised distillate without adversely affecting the properties of said desulphurised distillate as respects its suitability for normal uses, separating a hydrogen-rich gas from the treated distillate, and recycling a portion of said hydrogen-rich gas to the contacting zone.

References Cited in the file of this patent

UNITED STATES PATENTS

| 2,691,623 | Hartley | Oct. 12, 1954 |
| 2,697,064 | Brown | Dec. 14, 1954 |
| 2,758,064 | Haensel | Aug. 7, 1956 |
| 2,760,905 | McClaren | Aug. 28, 1956 |